US008192801B2

(12) United States Patent
Song et al.

(10) Patent No.: US 8,192,801 B2
(45) Date of Patent: Jun. 5, 2012

(54) SELF-DEPOSITED COATINGS ON MAGNESIUM ALLOYS

(75) Inventors: Guangling Song, Troy, MI (US); Yar-Ming Wang, Rochester Hills, MI (US); Hong-Hsiang Kuo, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 683 days.

(21) Appl. No.: 12/362,499

(22) Filed: Jan. 30, 2009

(65) Prior Publication Data

US 2009/0269501 A1    Oct. 29, 2009

Related U.S. Application Data

(60) Provisional application No. 61/047,766, filed on Apr. 25, 2008.

(51) Int. Cl.
*C25D 13/00* (2006.01)

(52) U.S. Cl. .......................... 427/470; 204/486; 204/502

(58) Field of Classification Search .............. 204/196.01–196.38, 471–512; 427/306, 435–437, 132; 205/321, 724–741; 148/275
See application file for complete search history.

(56) References Cited

U.S. PATENT DOCUMENTS

| 4,215,162 A * | 7/1980 | Kunnen et al. ............ 427/435 |
| 5,773,090 A | 6/1998 | Buttner et al. |
| 6,020,069 A * | 2/2000 | Antonelli et al. ............ 428/413 |
| 2006/0099332 A1 | 5/2006 | Eriksson et al. |
| 2007/0235318 A1 * | 10/2007 | Tazzia et al. .................. 203/39 |

OTHER PUBLICATIONS

Song et al. Adv. Eng. Mat. 1999 1, No. 1.*
Written Opinion for application No. PCT/US2009/041328 dated Dec. 3, 2009.
International Search Report for application No. PCT/US2009/041328 dated Dec. 3, 2009.

* cited by examiner

*Primary Examiner* — Jeffrey T Barton
*Assistant Examiner* — Steven Rosenwald
(74) *Attorney, Agent, or Firm* — Reising Ethington P.C.

(57) ABSTRACT

Some articles such as automobile components that have been constructed from steel and/or aluminum alloy parts are now being fitted with magnesium parts whose surfaces may need to be protected against corrosion. To do this an e-coating pre-film may be formed on the part's magnesium surfaces by exposing it to a conventional e-coating emulsion. And there is no need to supply a current or potential to the part or component. Magnesium's high reactivity with acidic or neutral aqueous mediums is itself a sufficient driving force to facilitate the deposition of an e-coating pre-film. At the same time any steel or aluminum alloy parts will remain unaffected. The article with a protective e-coating pre-film formed solely on its magnesium surfaces may now be advanced through a paint-line that includes conventional processes aimed at treating the component's steel and aluminum alloy parts. The process may be practiced where the magnesium surface comprises a magnesium-containing conversion or anodized coating.

11 Claims, 2 Drawing Sheets

SELF-DEPOSITED COATINGS ON MAGNESIUM ALLOYS

This application claims priority based on provisional application 61/047,766, titled "Self-Deposited Coatings on Magnesium Alloys," filed Apr. 25, 2008.

TECHNICAL FIELD

This invention relates to providing a protective coating to a magnesium alloy article, or to a magnesium alloy portion of an article formed of differing metal components. More specifically, an aqueous based e-coating polymer layer is selectively formed on magnesium surface portions of the article without application of an electrical current or potential. Additional coatings may, optionally, then be applied over the magnesium surface and/or over any differing metal surfaces of an article.

BACKGROUND OF THE INVENTION

A wide variety of automobile components have traditionally been formed from steel alloys and, more recently, from aluminum alloys. In many instances the corrosion resistance of these components is bolstered to ensure product longevity; especially since the component is likely to encounter harsh environments. For example, automobile body frame and panel structures constructed from joined steel and aluminum alloy parts are routinely provided with a variety of coating layers to protect the underlying metal alloys against corrosion-advancing substances such as air, water, and salt. These layers may also be designed to ensure that later-applied paint coatings adequately adhere to the body structure's surface. And customarily the automotive industry has applied these corrosion-resistant coatings by progressively advancing automobile body structures and related panels (sometimes called a body in white) through a protective coating and painting line that includes a series of procedures such as, among others, a phosphating and electrocoating (e-coating) stage.

In recent years, however, the incorporation of magnesium alloys into automobile components has been the subject of considerable investigation and development due to those materials' relatively low density as compared to other structural metals. The magnesium alloys may be used in pillars, frames and other body members, and the alloys may be used in sheet metal form as inner or outer body panels or the like. The magnesium alloy components may be attached to complementary aluminum alloy or ferrous alloy parts by welding, bolting, riveting, hemming, or other suitable joining process. But unfortunately, unlike steel and aluminum alloys, magnesium-based metals are not particularly well suited for exposure to conventional phosphating and e-coating procedures; mostly because magnesium surfaces are highly active when exposed to neutral or acidic aqueous liquids. A number of issues have thus arisen when attempting to progress a multi-metal automobile component that includes magnesium alloy parts through a conventional automobile paint-line. On one hand, it is desirable to advance the component through the paint-line so as to adequately treat any steel or aluminum alloy parts against corrosion prior to painting. But on the other hand the magnesium alloy parts deteriorate in the process.

In light of these and other issues a component's magnesium alloy parts may be protected against corrosion by alternative practices, such as spark-anodizing (micro-arcs, plasma electrolytic oxidation, etc). These practices sometimes require the component to be redirected off-line and separately treated from the conventional automobile paint-line. And they can also necessitate selective and precise treatment of only the specific magnesium alloy parts of the component; an option that is, practically speaking, rather difficult. These alternative practices can thus become tedious, inefficient and expensive. What is therefore needed is an efficient and easily operated technique to protect components made wholly or partly of magnesium and magnesium alloy parts that can potentially take advantage of the automobile paint-lines and procedures currently being utilized.

SUMMARY OF THE INVENTION

Disclosed is a technique for forming an e-coating pre-film on a magnesium surface of a component, such as an automobile component, to at least temporarily protect the magnesium surface from corroding, especially in a water-containing environment.

When the component is substantially all magnesium, an e-coating composition is formed on the magnesium surface, as will be described, without application of an electrical potential or current. The deposited e-coating may then be baked or cured to provide a first corrosion barrier on the magnesium surface. If desired, this e-coat may be supplemented with additional paint layers or other protective coatings.

When the article is a multi-metal component that encompasses a magnesium portion in combination with other metal potions, the magnesium portion may be selectively e-coated first (without electrical current or potential) before the article with its other metal portions is submerged in, for example, conventional phosphating and e-coating baths without oxidizing and thus contaminating the baths with $Mg^{2+}$ ions. The e-coating pre-film may also be optionally cured anytime after deposition to transform the pre-film into a stronger, more durable, and more corrosion-resistant final e-coating layer. The term magnesium as used herein is meant to denote pure magnesium and magnesium-based alloys that comprise magnesium as their major constituent.

The invention will be further illustrated in an embodiment in which an article comprises magnesium portions and aluminum and/or steel portions (including galvanized steel). It is contemplated that an e-coating pre-film may be selectively formed on the magnesium surface or surfaces of an automobile component to the exclusion of other metallic surfaces before the component partakes in a conventional phosphating or e-coating procedure aimed at treating those other metallic surfaces. The e-coating pre-film formed on the component's magnesium surfaces is often cultivated from an acid-dispersed aminoepoxy-based polymer resin similar to those used for on steel and aluminum alloy surfaces during conventional cathodic e-coating procedures. But of course other known e-coating pre-films constituting a different polymeric composition can also be formed.

The e-coating pre-film can be formed according to common mechanisms in which the film uniformly coagulates and adheres to the magnesium surface after e-coating polymer particles dispersed in an emulsion are destabilized in a basic environment. But in the case of magnesium—unlike steel or aluminum alloy surfaces—there is no need to subject it to a current or potential in order to initiate the e-coating process. Rather, magnesium's relatively high reactivity with water can be exploited to promote neutralization and deposition of the polymer film.

As relevant here, magnesium is active in acidic or neutral aqueous solutions reacting almost immediately with water to generate magnesium ions ($Mg^{2+}$), hydroxyl ions ($OH^-$), and hydrogen gas ($H_2$). And conventional e-coating solutions or emulsions generally exhibit a low enough pH to facilitate this reactivity. Thus, the exposure of an automobile component's clean magnesium surface to a conventional e-coating emulsion naturally generates $OH^-$ ions immediately near the magnesium surface/e-coating emulsion interface. This in turn results in a localized spike in basicity sufficient to destabilize any dispersed electrocoat particles present near the magnesium surface without the need to externally supply a current or potential to the component. As a result an e-coating pre-film is formed exclusively on the magnesium surfaces. And because a current or potential is not applied here, any portions of the component made from steel (including galvanized steel) or aluminum alloys will not be affected and will remain uncoated except for the possible presence of a small amount of drag-out that may easily be washed off.

The e-coating pre-film may be selectively formed on the magnesium surface or surfaces in a variety of coating processes. In one embodiment, an automobile component with a clean magnesium surface may be directly immersed into a conventional e-coating bath. No current or potential is applied to the component while it is immersed. Then, after a suitable period for resin deposition, the component may be removed from the bath and drained. An e-coating pre-film is now present exclusively on the component's magnesium surfaces as a result of the mechanisms previously described even though portions of the component made from other metals such as steel or aluminum alloys were also immersed. In another embodiment, a conventional aqueous e-coating emulsion may be painted on a clean magnesium surface of an automobile component with a brush or other equivalent application device. An e-coating pre-film thus forms on the painted magnesium surfaces by the same mechanism as before. A similar film does not form at, for example, steel or aluminum alloy surfaces of the component that may have been inadvertently painted. In yet another embodiment, a conventional e-coating emulsion may be sprayed on a clean magnesium surface of an automobile component with any known spraying device. The results here are the same as in the other embodiments.

An automobile component with an e-coating pre-film formed on its magnesium surfaces may now be phosphated and e-coated according to conventional practices to treat the component's other metallic surfaces—namely, its steel and aluminum alloy surfaces. During phosphating or other conversion coating processes, the e-coating pre-film previously formed on the component's magnesium surfaces temporarily protects these surfaces against oxidation while the other metallic surfaces are being phosphated in a phosphating bath. Then, when the automobile component is later submerged in an e-coating bath, the existing e-coating pre-film present on its magnesium surfaces will be repaired, thickened and strengthened while the other now phosphated metallic surfaces are being coated with their original e-coating pre-film. Afterwards, a final and stable e-coating can be achieved over the entire automobile component by curing all the e-coating pre-films that have just been deposited. Similar behavior, albeit less drastic, can be expected if the e-coating pre-film covering the component's magnesium surface is cured before the component's steel and aluminum alloy surfaces are treated.

The component may now be coated with one or more protective and decorative paint layers as desired.

The deposition of e-coating pre-films may also be accomplished on certain magnesium workpieces on which a porous conversion coating or anodized coating has been formed. Here, a conversion or anodized coating is a relatively thin layer formed on a magnesium or magnesium alloy surface resulting from a chemical or electrochemical reaction between magnesium and one or more constituents of a bath solution. A conversion coating, for example a magnesium phosphate coating, may comprise magnesium-containing salts, hydroxides and/or oxides. An anodized coating, for example a commercial Anomag™ coating may comprise magnesium-containing salts (e.g., magnesium phosphate), hydroxides and/or oxides. The coatings are typically porous and the pores may contain alkaline compounds due to hydrolysis of magnesium in the pores due to reaction with residual conversion bath materials. E-bath coatings may be deposited, without a deposition current, into the pores of such coatings and on their surfaces. The e-coat pre-film may be cured as described above, and additional coating layer applied on top of the e-coat composition. The practice may be performed on individual magnesium alloy workpieces or on assemblies comprising magnesium portions with a porous conversion coating and portions formed of other metals.

Other objects and advantages of the invention will be apparent from more detailed descriptions of illustrative embodiments which follow in this specification.

DESCRIPTION OF PREFERRED EMBODIMENTS

Figure 1:
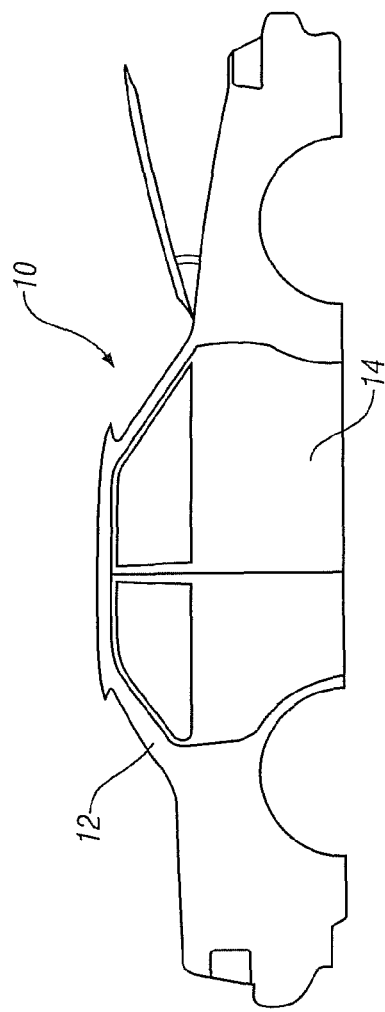
FIG. 1 is a generalized side view of an automobile component, more specifically an automobile body structure that includes a magnesium part in conjunction with other metal parts such as those made from steel and/or an aluminum alloy.

Embodiments of this invention comprise the formation of a coating of a cathodic electro-coat polymer composition on a magnesium surface without the application of an electrical current or potential normally used in depositing the e-coat composition on electrically conductive workpiece surfaces. This process may be used to apply e-coat pre-coatings on a substantially pure magnesium surface or a magnesium-based alloy surface or a porous magnesium-containing conversion coating surface on a workpiece of magnesium or magnesium alloy. Such magnesium-containing conversion coatings, may include porous anodized magnesium coatings comprising a magnesium oxide coating or other conversion coatings comprising salts, hydroxides and/or oxides of magnesium. The coating generally will be porous and cracked. The e-coat solution is able to penetrate such cracks and pores to react with the magnesium surface and seal the cracks or pores. In general, the magnesium content of the coating comes from the magnesium substrate that is exposed to the conversion coating bath in this chemically reactive process or to the anodizing bath in this electrochemically reactive process.

The process may be practiced with such magnesium workpieces absent the presence of another metal and it may be practiced on workpiece assemblies that comprise a magnesium portion and another portion of aluminum and/or steel or other ferrous alloy. In one illustrative embodiment of the invention, the coating process is used on multi-metal body members in automotive vehicle paint lines.

Automobile paint-lines were originally designed to prepare and cover automobile components made entirely from steel and/or aluminum alloys. These paint-lines typically included—near their beginning—one or more procedures aimed at protecting the steel and/or aluminum alloy surfaces against corrosion. In one common set-up the automobile component is first provided with a phosphate conversion coating by immersing the component in an acidic phosphating bath. The phosphate conversion layer provides corrosion resistance and an adherent base for painting.

Next, the phosphated automobile component is usually provided with an e-coating pre-film over and within the pores of the phosphate conversion coating by a cathodic electrocoating process (also sometimes referred to in the automotive industry as electrophoretic deposition or ELPO). This process generally comprises immersing the automobile component as a cathode into an e-coating bath and applying an appropriate current or potential thereto such that polymer e-coating particles dispersed within the bath deposit onto the component as a substantially uniform polymer film. The e-coating pre-film may now be cured into a stable and final e-coat before the automobile component is painted downstream in the paint-line.

But the incorporation of magnesium parts into automobile components has complicated the use of these already-established automobile paint-lines. For one thing, as discussed before, magnesium is highly active in acidic or neutral aqueous solutions reacting almost immediately with water to generate magnesium ions ($Mg^{2+}$), hydroxyl ions ($OH^-$), and hydrogen gas ($H_2$). And with respect to conventional phosphating procedures, this reactivity can make the formation of phosphate conversion coatings rather difficult because the magnesium surface of the component progressively corrodes when exposed to the acidic phosphating bath. Moreover, the unwelcome contamination of conventional phosphating and e-coating baths with $Mg^{2+}$ ions can arise since the pH of those baths are low enough to facilitate the reaction of magnesium with water.

Still further, the reactive nature of magnesium can adversely impact other parts of the automobile component that may be formed of less-active steel or aluminum alloys. For example, the presence of magnesium ions in a phosphating or e-coating bath can reduce the quality of the particular coatings formed on these metallic surfaces. As another example galvanic corrosion may occur between the magnesium parts of the automobile component and the steel and aluminum alloy parts to which they are closely coupled.

To address these and other related issues an e-coating pre-film may be formed on the magnesium surfaces of the automobile component before subjecting the component to an automobile paint-line's conventional phosphating and e-coating procedures. This allows both the magnesium surfaces and the steel/aluminum alloy surfaces of the component to be protected against corrosion without having to drastically rework or supplement the operational paint-lines already in use. Of course, if the automobile component contains only magnesium and no other metals, then it may be possible to bypass the phosphating procedure and continue sending the component through the remainder of the paint-line.

To help illustrate this technique, FIG. 1 shows, as an embodiment of a multi-metal automobile component, an automobile body structure 10 that includes magnesium parts as well as steel and/or aluminum alloy parts. Here, the body structure 10 includes a frame 12 that is primarily formed from a combination of galvanized steel and aluminum alloys. The body structure 10 also includes a door assembly 14 that constitutes a thin and previously formed magnesium alloy panel that is hinged at one side to the frame 12. An example of a suitable magnesium alloy that may used in door assembly 14 is magnesium alloy AZ31, which has a nominal composition, by weight, of about 3% aluminum, about 1% zinc, about 0.2% manganese, and the balance magnesium. It should be understood, however, that this figure represents a simplified illustration of a rather complex structure that contains many different interacting parts attached through a variety of means. And as such there are many other parts—both larger and smaller than the door assembly 14—that could feasibly be constructed fully or partly from magnesium even though they are not specifically shown or described here. It follows that the magnesium surfaces of those parts will behave similarly to the magnesium surfaces of the door assembly 14 of this embodiment.

Figure 2:
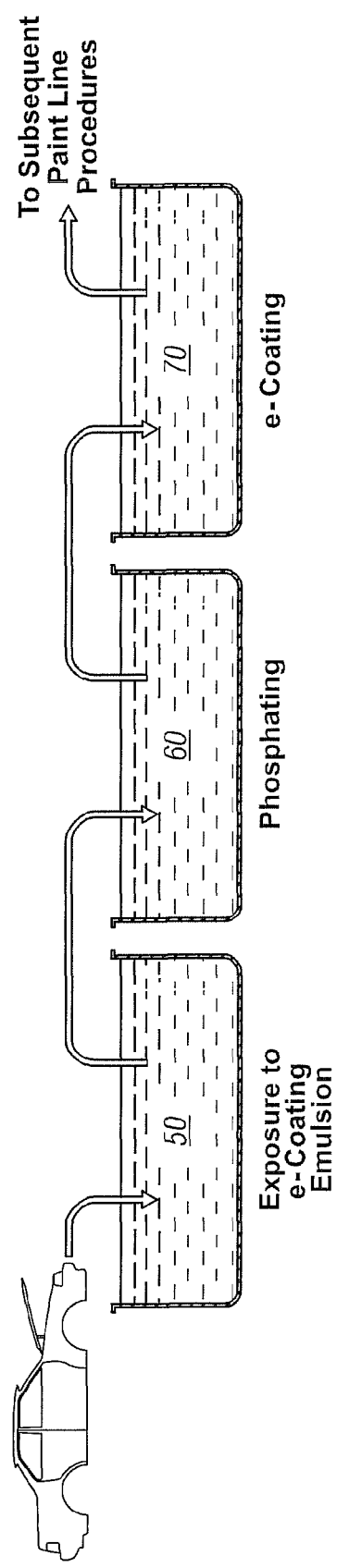
FIG. 2 is a schematic illustration of a method for treating the automobile component of FIG. 1 to improve the corrosion resistance of the magnesium surfaces and the other metal surfaces before the automobile component is painted.

The e-coating pre-film may be formed solely on the magnesium surfaces of the door assembly 14 by contacting at least those parts of the body structure 10 with a conventional aqueous e-coating emulsion, as depicted by step numeral 50 in FIG. 2. And such a pre-film can be formed without the need to supply the door assembly 14 with a current or potential. This is because the magnesium surface itself, through its corrosion reaction with water of the e-coating emulsion, can naturally generate the necessary basic environment in its locality such that dispersed e-coating particles precipitate out of the e-coating emulsion. These newly destabilized and insoluble e-coating polymer-containing particles then begin to coagulate and adhere to the magnesium surfaces of the door assembly 14 in a uniform and consistent manner. Where the magnesium surface comprises a porous conversion or anodized coating, the e-coat deposits in the pores of the coating and on surfaces of the conversion coating. This is not the case however with the steel and aluminum alloy parts of the body structure 10 as they, for the most part, need a sufficiently large current or an appreciable negative potential to promote redox reactions in order to achieve a sufficient basic environment in their vicinity. Thus in step 50 an e-coating pre-film does not coagulate and adhere to the body structure's steel and aluminum alloy surfaces.

Conventional e-coating emulsions useful in step 50 are generally known and commercially available to skilled artisans. For instance, a cathodic e-coating emulsion may be utilized that comprises a mixture of a resin feed package and a pigment feed package. The resin feed package may include a cathodic electrocoat or electroprimer that is partially neutralized with a weak organic acid ($R_a$—H), such as acetic acid, and then emulsified in water. The cathodic electrocoat used here is typically composed of an aminoepoxy resin (R—$NH_2$) mixed with a blocked isocyanate crosslinker. And as such the resin feed package emulsion stabilizes to contain an amount of water soluble polymer e-coating particles (R—$NH_3^+$), as shown by the reaction:

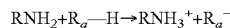

$$RNH_2 + R_a\text{—}H \rightarrow RNH_3^+ + R_a^-$$

An example of a commercially available cathodic electrocoat useful in forming the resin feed package is an epoxy resin with titanium dioxide particles, which is available from DuPont. The pigment feed package, on the other hand, may include a blend of pigments dispersed in various grinding media. These pigments are designed and selectively utilized to ultimately provide appearance, color, and physical properties to the e-coating pre-film.

To form the cathodic e-coating emulsion, the resin feed package and the pigment feed package are oftentimes mixed in assembly plant facilities and replenished opposite a constant production rate to achieve an emulsion that exhibits chemistry constants of approximately about 15-25% non-volatiles, about 10-25% pigments (based on non-volatiles), about 0-1% solvents, and the remainder water. And at this compositional make-up the emulsion typically possesses a pH of about 5.8 to about 6.2, a conductivity of about 1300 to about 2000 microsiemens/cm, and between about 15 and about 35 acid milliequivalents per gram of nonvolatile matter.

Figure 3:
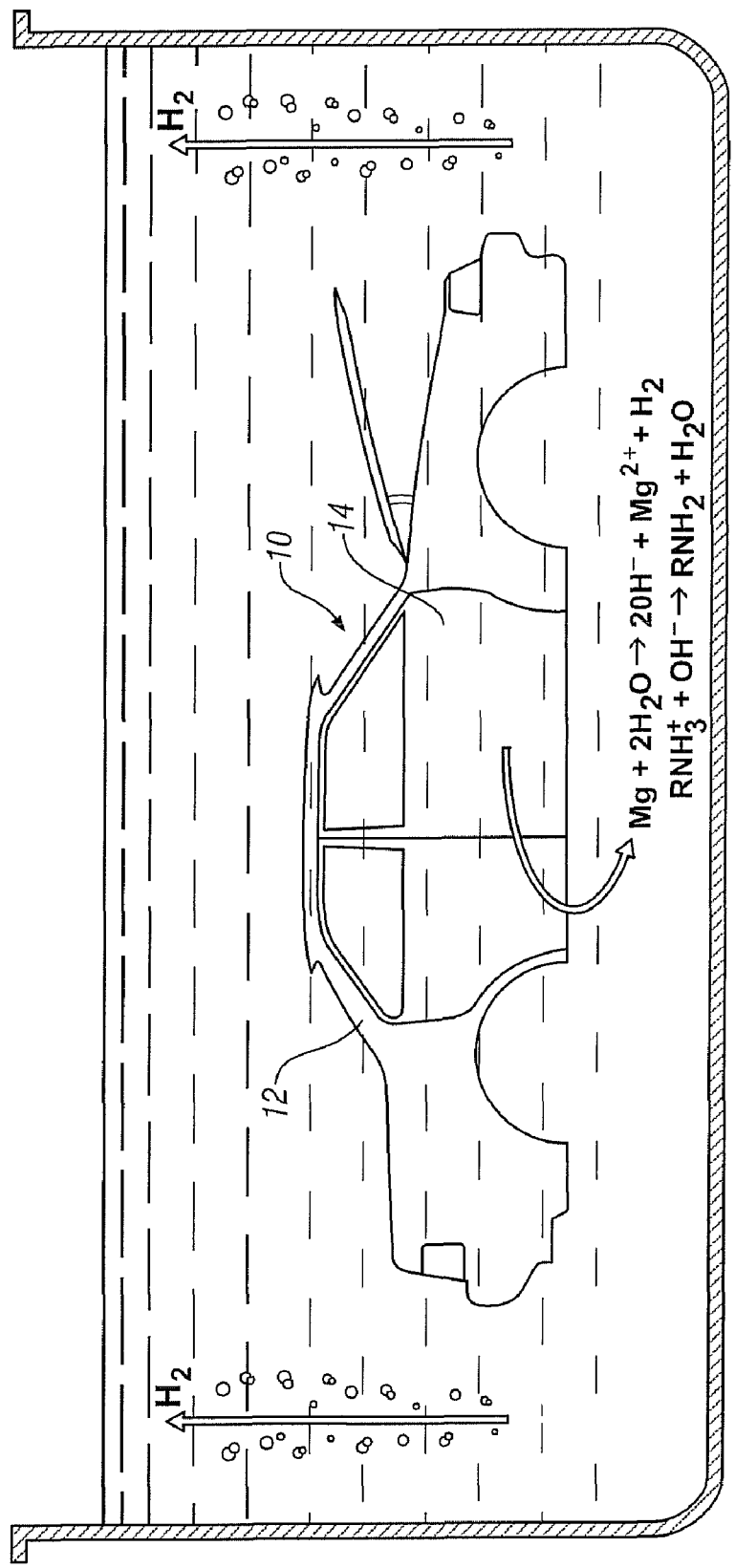
FIG. 3 is a more detailed schematic representation of the first step shown in the method illustrated in FIG. 2.

The magnesium surfaces of the door assembly may be exposed to the cathodic e-coating emulsion in several manners. In one embodiment, as shown best in FIG. 3, the automobile body structure 10 with clean magnesium surfaces on the door assembly 14 may be immersed in a bath of the cathodic e-coating emulsion without supplying a current or potential thereto. And as mentioned before, and shown graphically in FIG. 3, the magnesium surfaces of door assembly 14 quickly react with water in the e-coating emulsion according to the reaction:

$$Mg + 2H_2O \rightarrow 2OH^- + Mg^{2+} + H_2$$

The generation of hydroxyl ions ($OH^-$) at the magnesium surface of the door assembly 14 raises the pH of the emulsion immediately near the magnesium surfaces to about 10.5. And this spike in basicity is sufficient to destabilize any dispersed e-coating polymer particles in the vicinity according to the reaction:

$$RNH_3^+ + OH^- \rightarrow RNH_2 + H_2O$$

As a result these destabilized and water insoluble $RNH_2$ e-coating polymer particles now precipitate out of the emulsion and uniformly deposit onto the magnesium surfaces of the door assembly 14 to form the protective e-coating pre-film. In addition the hydrogen gas ($H_2$) by-product generated when magnesium reacts with water can be somewhat helpful in that the escaping gas can stir the emulsion and facilitate the flow of additional $RNH_3^+$ e-coating polymer particles towards the door assembly 14 for deposition.

The automobile body structure 14 may be immersed in the cathodic e-coating bath for about 2 seconds to about 1 minute in order to form an e-coating pre-film capable of protecting the magnesium surfaces during subsequent paint-line procedures. Such immersion times generally result in e-coating pre-films of about 1 millimeter to about 5 millimeters being formed. Afterwards the automobile body structure 10 may be rinsed and drained to remove any access drag-out before it advances to the next paint-line procedure. It can also be subjected at this point to a curing operation such as baking or UV light exposure to polymerize the e-coating pre-film into a final and stable e-coating, if desired.

In another embodiment, the automobile body structure 10 may be exposed to the conventional e-coating emulsion by physical application with, for example, a paint brush or other equivalent tool. Or in yet another embodiment, the automobile body structure 10 may be exposed to the conventional e-coating emulsion by direct spraying through a manual or automated spraying apparatus. In both embodiments, however, the e-coating pre-film forms exclusively on the magnesium surfaces of the door assembly 14 via the same chemical mechanism described earlier.

Following step 50 the automobile body structure 10 with an e-coating pre-film—or a final e-coating film—formed only on the magnesium surfaces of the door assembly may be further progressed through the paint-line. And since the body structure 10 includes steel and aluminum parts, the remainder of paint-line likely includes a phosphating procedure 60 and an e-coating procedure 70 each specifically aimed at treating these alloy surfaces. Both of these procedures, which are depicted in FIG. 2, are well known to skilled artisans as they relate to treating steel and aluminum alloys and thus need not be described in great detail.

During the phosphating step 60 the automobile body structure 10 may be immersed in a phosphating bath or sprayed with a similar solution to form a phosphate conversion coating on the structure's 10 steel and aluminum alloy surfaces. Phosphating baths are generally known in the art and for the most part are phosphoric acid based solutions containing, among others, metal phosphates. The resulting conversion coating, which is generally formed of crystalline phosphates, enhances the corrosion resistance of the steel and aluminum alloy surfaces and enhances the adherence capabilities of later-applied paint coatings. This coating is also porous and dielectric to some extent thus allowing the electrochemical application of subsequent coatings if desired.

But unlike the steel and aluminum alloy surfaces a phosphate conversion coating does not form on the magnesium surfaces of the door assembly 14. This is so because the previously deposited e-coating pre-film acts as a barrier and shields the underlying magnesium surfaces from the phosphating bath. This protective e-coating pre-film does, however, suffer some damage during the phosphating stage 60 because of the acidic nature of the bath. Nevertheless the e-coating pre-film deposited over the magnesium surfaces in step 50 can generally remain substantially intact throughout the duration of a normal phosphating procedure. And thus the magnesium surfaces of the door assembly 14 emerge from the phosphating step 60 without suffering any significant corrosive attack during that procedure.

Next, a common practice in the automobile industry is to cathodically electrocoat the phosphated steel and aluminum alloy surfaces of the automobile body structure 10, as depicted in the e-coating step 70 in FIG. 2. The body structure 10 may be cathodically immersed in a cathodic e-coating bath or sprayed with a similar emulsion to form an e-coating pre-film on the body structure's 10 steel and aluminum alloy surfaces. And this e-coating pre-film is similar to the one formed on the door assembly's 14 magnesium surfaces. In fact the same e-coating emulsion that was used in step 50 can also be used here if desired. The only difference in this step is that an electrical current or potential needs to be supplied between the body structure 10 and auxiliary anodes because a natural driving force is not present to compel the precipitation and deposition of dispersed e-coating particles.

The application of a current or potential in step 70 causes water molecules to disassociate into hydroxyl ions ($OH^-$) near the steel and aluminum alloy surfaces of the body structure 10 (serving as a cathode), and hydrogen ions ($H^+$) near the auxiliary anodes. This in turn results in a pH increase in the vicinity of the body structure 10 and a pH decrease at the anode(s). And such a pH increase near the body structure 10 destabilizes any e-coating polymer particles present such that they precipitate out of the emulsion and begin to uniformly coagulate and adhere to the phosphated steel and aluminum alloy surfaces of the body structure 10. Also at this time the e-coating pre-film previously formed on the magnesium surfaces of the door assembly 14 is repaired, thickened, and strengthened after suffering slight damage during the phosphating step 60. It should be noted that the thickness of the e-coating pre-films formed on the steel and aluminum alloy surfaces, and also the magnesium surfaces to some extent, can be controlled during the e-coating step 70 through several process variables such as submersion time, bath temperature, the magnitude of the applied current or potential, and the particular materials used to make the e-coating emulsion. And skilled artisans will know and understand how to do so.

Upon completion of the e-coating step 70, the automobile body structure 10 described here now includes a frame 12 constructed largely from steel and aluminum alloy parts and a door assembly 14 constructed at least partially from a magnesium part. And the surfaces of each of these metal parts have been treated to enhance their corrosion resistance. As such the e-coating pre-films that collectively cover all these surfaces may now be cured, if they have not already, so that they polymerize into a final and stable e-coat. Known curing processes that are useful here include baking or UV light exposure. The automobile body structure 10 may now be ready to receive additional surface coatings as it progresses through the remainder of the paint line. These additional coatings include surface primers, base coats, and clear coats. And they are applied to the automobile component by known practices such as spraying.

When a magnesium metal or magnesium alloy surface is immersed in an aqueous bath of e-coat polymer composition water reacts with the magnesium surface as described to provide a basic environment for deposition of a pre-polymer coating. When a magnesium-based workpiece with a porous magnesium-containing conversion or anodized coating is immersed in the bath of e-coat polymer, it is found that the e-coat suspension is de-stabilized and e-coat material is deposited in the pores of the coating. The e-coat material enters the pores and deposits a film of pre e-coat material on pore surfaces. The deposit continues onto the outer surfaces of the pores to the outer layer of the conversion coating. The deposition may be prompted by residual conversion coating material the reacts with the e-coat material entering the pores or columns of the conversion layer. Or the e-coat material may react with the magnesium content of the pore surfaces.

Conversion coatings are formed as generally self-limiting layers, often a few microns thick, typically less than 10 µm in thickness, on the surface of the magnesium workpiece. The coatings characterized by pores, cracks, and/or columns. Examples of magnesium conversion coating materials that act mainly by chemical reaction with a magnesium surface include chromate materials, phosphate/permanganate materials, stannate materials and fluorozirconate material treatments. Anodized coatings may also be formed on a magnesium surface by a combination of chemical and electrochemical reactions between magnesium metal and an anodizing bath when an anodic current is passed through the metal/solution interface. An example of a commercial anodizing process, developed by Magnesium Technologies Ltd. and marketed under the tradename Anomag, calls for a phosphate-containing bath composition. Such anodized coatings also present suitable porosity for pre-deposition of e-coat material.

The above description of embodiments of the invention is merely exemplary in nature and, thus, variations thereof are not to be regarded as a departure from the spirit and scope of the invention.

The invention claimed is:

1. A method for protecting an article against corrosion, the article comprising a magnesium surface portion and at least one of a steel surface portion and aluminum surface portion, the method comprising:
    providing a first aqueous e-coating emulsion in which water can react with the magnesium surface to generate hydroxyl ions at the interface of the magnesium surface and the e-coating emulsion, the emulsion having dispersed therein a cathodic electrocoat composition that destabilizes in a basic aqueous environment; and
    exposing at least the magnesium surface of the article to the first aqueous e-coating emulsion without applying a current or potential to the article to deposit an e-coating pre-film exclusively on the magnesium surface, and wherein the e-coating pre-film provides the magnesium surface with temporary protection against a chemical reaction with water in a neutral or acidic aqueous medium;
    exposing at least the steel and/or aluminum surfaces of the article to a conversion coating solution to deposit a conversion coating on the steel and/or aluminum surface portions; and
    exposing at least the steel and/or aluminum surface portions to a second aqueous e-coating emulsion and applying a current or potential to the article such that it serves as a cathode, and wherein the application of a current or potential deposits an e-coating pre-film on the aluminum and/or steel surface portions.

2. The method of claim 1, wherein the article is an automobile body structure.

3. The method of claim 1, wherein the magnesium surface portion of the article is an automotive body panel.

4. The method of claim 1 in which a magnesium surface portion of the article comprises a magnesium-containing conversion coating.

5. The method of claim 1 wherein providing a first aqueous e-coating emulsion comprises providing an e-coating emulsion having dispersed therein a cathodic electrocoat that comprises an aminoepoxy resin neutralized with a weak organic acid and emulsified in water.

6. The method of claim 1, wherein providing a first aqueous e-coating emulsion comprises providing an e-coating emulsion having dispersed therein a cathodic electrocoat that destabilizes in a basic environment that has a pH value of about 10.5 or greater.

7. The method of claim 1, wherein providing a first aqueous e-coating emulsion comprises providing an e-coating emulsion that comprises a pH of about 5.8 to about 6.2, a conductivity of about 1300 to about 2000 microsiemens/cm, and about 15 to about 35 acid milliequivalents per gram of nonvolatile matter.

8. The method of claim 1, wherein exposing at least the steel and/or aluminum surface portions to a second aqueous e-coating emulsion comprises exposing the surfaces to an e-coating emulsion that is the same composition as the first e-coating emulsion.

9. The method of claim 1, wherein exposing at least the magnesium surface of the automobile component to the first e-coating emulsion comprises immersing the automobile component in a bath of the first e-coating emulsion.

10. The method of claim 1, wherein exposing at least the magnesium surface of the article to the first e-coating emulsion comprises painting at least the magnesium surface portion with the first e-coating emulsion using a painting tool.

11. The method of claim 1, wherein exposing at least the magnesium surface of the article to the first e-coating emulsion comprises spraying at least the magnesium surface with the first e-coating emulsion.

* * * * *